United States Patent [19]

Carter, Jr.

[11] Patent Number: 4,468,967

[45] Date of Patent: Sep. 4, 1984

[54] ACOUSTIC PLUG RELEASE INDICATOR

[75] Inventor: Ernest E. Carter, Jr., Duncan, Okla.

[73] Assignee: Halliburton Company, Duncan, Okla.

[21] Appl. No.: 438,675

[22] Filed: Nov. 3, 1982

[51] Int. Cl.³ .............................................. G01H 1/00
[52] U.S. Cl. ..................................... 73/661; 73/155
[58] Field of Search ............. 73/584, 594, 661, 432 R, 73/432 B, 861.18, 151; 181/105; 367/81; 369/14; 340/861

[56] References Cited

U.S. PATENT DOCUMENTS

| | | | |
|---|---|---|---|
| 2,201,311 | 5/1940 | Halliburton | 181/105 |
| 2,277,110 | 3/1942 | Johnson | 181/105 |
| 2,572,157 | 10/1951 | Kay | 369/14 |
| 2,769,929 | 11/1956 | Hardway | 73/661 |
| 3,176,513 | 4/1965 | Kriete | 73/861.18 |
| 4,206,810 | 6/1980 | Blackman | 340/861 X |

*Primary Examiner*—James J. Gill
*Attorney, Agent, or Firm*—James R. Duzan; Thomas R. Weaver

[57] ABSTRACT

The present invention comprises an acoustic plug release indicator system. The acoustic plug release indicator system comprises a microphone, recording system and operator listening device.

13 Claims, 1 Drawing Figure

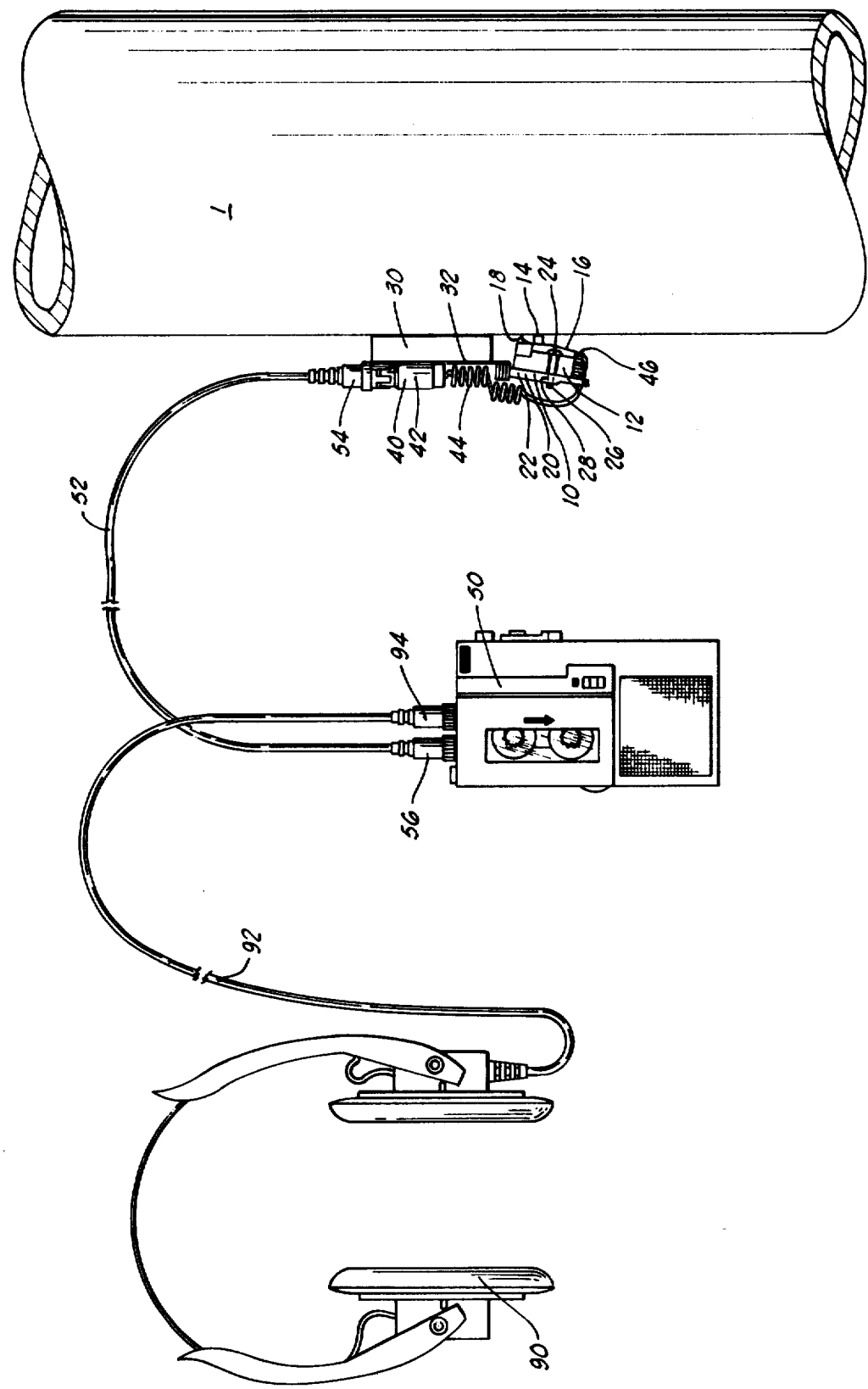

ACOUSTIC PLUG RELEASE INDICATOR

BACKGROUND OF THE PRIOR ART

This invention relates to an acoustic plug release indicator system for use in well cementing operations.

In well cementing operations insuring the positive release of the cementing plug from the cementing plug container is a serious problem. Typical prior art cementing plug containers utilize a mechanical lever actuated type plug release indicator to indicate the passage of the cementing plug from the cementing plug containers. In some instances, these prior art mechanical lever actuated type plug release indicators may indicate the passage of the cementing plug from the cementing plug container, although the cementing plug is still contained within the container. The failure to properly release the cementing plug from the cementing plug container can ruin an otherwise profitable well cementing job due to the over-displacement of the cement to insure an adequate amount of cement has been pumped into the annulus between the casing and wellbore.

Another type of cementing plug indicator utilizes a radioactive nail placed into the cementing plug in the cementing plug container. When the cementing plug having the radioactive nail lodged therein is no longer present in the cementing plug container, a radiation measuring instrument, such as a Geiger counter, will not react to the radiation emitted from the radioactive nail in the cementing plug thereby indicating that the plug is no longer in the cementing plug container. However, since the shelf life of readily available and easily handled radioactive nails is limited, when working in remote areas, such nails may be difficult to obtain and store.

STATEMENT OF THE INVENTION

The present invention comprises an acoustic plug release indicator system. The acoustic plug release indicator system comprises a microphone, recording system and operator listening device. In addition to the monitoring of the release of a cementing plug in a well, the present invention can also be used to monitor the fall of free-fall type objects in a well casing and other types of objects which are pumped down a well casing.

BRIEF DESCRIPTION OF THE DRAWING

The advantages of the present invention will be better understood from the following description of the invention and drawing wherein:

The FIGURE is a representation of the present invention taken in conjunction with a representation of a segment of well casing.

DESCRIPTION OF THE INVENTION

Referring to FIG. 1, the acoustic plug release indicator system of the present invention is shown in its preferred embodiment.

As shown, the acoustic plug release indicator system comprises a microphone assembly 10, recording system 50 and operator listening system 90.

The microphone assembly 10 is shown releasably secured to a piece of well casing 1. The microphone assembly 10 comprises a stereo phono cartridge 12, mounting plate 20 and connector 40. The stereo phono cartridge 12 has a stop 14 thereon secured to the surface 16 from which the needle 18 protrudes. The stereo phono cartridge 12 is releasably secured to a flexible portion 22 of the mounting plate 20 by means of a threaded screw 24 having the threaded portion 26 thereon engaging threaded aperture 28 in the mounting plate 20. The flexible portion 22 is flexibly secured to a rigid magnetic portion 30 of the mounting plate 20 by means of a piece of flexible adhesive tape 32. Secured to rigid magnetic portion 30 of the mounting plate 20 by any suitable means is connector 40.

The connector 40 comprises a pin type connector body 42 having leads 44 extending therefrom having, in turn, connectors 46 on one end thereof releasably secured to terminals (not shown) extending from the stereo phono cartridge 12.

The stereo phono cartridge 12 may be any suitable commercially available ceramic type or magnetic type stereo phono cartridge which has a frequency range of approximately 20 to 20,000 Hertz, although any commercially available ceramic type stereo phono cartridge is preferred since they exhibit higher signal gain characteristics than the magnetic type. The rigid magnetic portion 30 of the mounting plate 20 may be formed of any readily available type magnetic material which is capable of magnetically supporting the microphone assembly 10 on the well casing 1. The flexible adhesive tape 32 may be any suitable commercially available type which is flexible enough to allow flexing of the stero phono cartridge 12 with respect to the rigid magnetic portion 30 of the mounting plate 20. The connector 40 may be of any suitable commercially available type which may be operably connected to stereo phono cartridge 12 and to the recording system 50. It should be understood that although the microphone assembly 10 has been magnetically releasably secured to the casing 1, it could be attached by other means, such as through the use of an adhesive, a mechanical clamp, etc. It should be further understood that although any commercially available components may be utilized in the microphone assembly 10, a model SHURE M91ED stereo phono cartridge, sold by SHURE Company is preferred, any commercially available fiberglass type flexible adhesive tape is preferred, an alnico type magnet, sold by Magnet Sales Co. is preferred, and RCA to min-phone jack type electrical connector, sold by Radio Corporation of America, Incorporated is preferred. It should be noted that monaural acoustic equipment may be used rather than stero equipment.

The recording system 50 is connected to the microphone assembly 10 by means of electrical conductor 52 having one end 54 releasably connected to connector 42 of the microphone assembly 10 and the other end 56 releasably secured to the recording system 50. The recording system 50 may be any commercially available stereo type recorder, although a model micro-dictator BM-500, sold by the Sony Corporation is preferred. Although a recording system 50 is preferred for use in the present invention, if desired, any type of signal amplifier may be used in place of the recording system if it is not desired to record the signal from the microphone. Suitable types of signal amplifiers are available from the Model LT-10, LT-15 and XLT-20 leak detectors, sold by Fisher Research Laboratory, Inc., Los Banos, Calif., or a C-Ducer amplifier, sold by C-Tape Developments, Guildford, England.

The operator listening system 90 is releasably connected to the recording system 50 by means of electrical conductor 92 having connector 91 on one end thereof. Although the listening system 90 may be any suitable type of commercially available stereo headphone, a model 210, sold by Jensen Co., Shillerpark, Ill., is preferred.

To use the acoustic plug release indicator system of the present invention the microphone assembly 10 is secured to the well casing 1 having the needle stop 14 and needle 18 in contact with the casing 1. The recording system 50 is connected to the microphone assembly 10 via electrical connector 52 while the operator listening system 90 is connected to the recording system 50 via electrical connector 92.

At any desired time prior to the release of the cementing plug from the cementing plug container the recording system 50 is activated to record the sounds emanating from the well casing 1. Upon the release of the cementing plug from the cementing plug container, the sound of the plug moving through the casing will be picked up by the microphone assembly 10, be transmitted to the recording system 50, be amplified and recorded by the recording system 50 and be audible in the operator listening system 90 connected to the recording system 50.

If desired, the cementing plug may be modified to produce a readliy discernible scraping sound as it moves through the well casing 1 which is distinct and identifiable by the operator using the acoustic plug release indicator system of the present invention by driving a metallic object into the cementing plug which will scrape on the interior of the wall casing 1 as it moves therethrough.

Although the acoustic plug release indicator system of the present invention has been described in connection with the detection of a cementing plug moving through the well casing 1, it is apparent to those skilled in the art that the acoustic plug release indicator system may be utilized to detect the movement of free-falling plugs, balls or other such objects which may free fall or be pumped through the well casing in a wide variety of well operations.

It can be easily seen that the acoustic plug release indicator system of the present invention offers several advantages over prior art devices, such as the ability to be run on any convenient exposed portion of the well casing, no preparation of the cementing plug or cementing plug container is required, no radioactive materials are required, a permanent record of the plug release is made for well records or to train new operators, the system is easily fabricated from readily available materials, the system requires no special maintenance, etc.

Having thus described my invention, I claim:

1. An acoustic release indicator system for detecting the movement of free-falling plugs, balls, or pumped objects in well casing in oil and gas well operations, said system comprising:
   a microphone system releasably secured to a portion of said well casing, having a portion thereof in contact with a portion of said well casing for detecting the movement of said free-falling plugs, balls, or pumped objects in said well casing;
   a recording system connected to the microphone system for recording the movement of said free-falling plugs, balls, or pumped objects in said well casing after the detection thereof by the microphone system; and
   a headphone listening system releasably connected to the recording system for listening to the movement of said free-falling plugs, balls, or pumped objects in said well casing.

2. The acoustic release indicator system of claim 1 wherein the microphone system comprises:
   a stereo phono cartridge;
   a mounting plate for releasably mounting the stereo phono cartridge on said well casing; and
   a connector connected to the stereo phono cartridge.

3. The acoustic release indicator system of claim 2 wherein:
   the stereo phono cartridge has a range of frequency response of approximately 20 to 20,000 Hertz; and
   the mounting plate for releasably mounting the stereo phono cartridge on said well casing comprises a flexible portion and a rigid portion, the flexible portion having a portion thereof secured to the stereo phono cartridge and a portion secured to the rigid portion of the mounting plate while the rigid portion is releasably secured to said well casing and connected to the flexible portion.

4. The acoustic release indicator system of claim 3 wherein:
   the stereo phono cartridge comprises a ceramic type stereo phono cartridge secured to the mounting plate.

5. The acoustic release indicator system of claim 3 wherein:
   the stereo phono cartridge comprises a magnetic type stereo phono cartridge secured to the mounting plate.

6. The acoustic release indicator system of claim 3 wherein:
   the rigid portion of the mounting plate comprises a magnetic type rigid portion releasably secured to said well casing.

7. The acoustic release indicator system of claim 3 wherein the flexible portion of the mounting plate is secured to the rigid portion of the mounting plate by adhesive tape.

8. The acoustic release indicator system of claim 1 wherein:
   the recording system comprises a tape recorder for recording the movement of said free-falling plugs, balls, or pumped objects in said well casing after the detection thereof by the microphone system.

9. An acoustic cementing plug release indicator system for use in well cementing operations for detecting the movement of a cementing plug from a cementing head and through the well casing being cemented into the earth in such well cementing operations, said cementing head being secured to said well casing, said indicator system comprising:
   a microphone system releasably secured to a portion of said well casing having a portion thereof in contact with a portion of said well casing for detecting the movement of said cementing plug from said cementing head and through said well casing, the recording system including:
   a stereo phono cartridge having a range of frequency response from substantially 20 to 20,000 Hertz;
   a mounting plate including a flexible portion and a rigid portion for releasably mounting the stereo phono cartridge on said well casing, the flexible portion having a portion thereof secured to the stereo phono cartridge and a portion secured to the rigid portion of the mounting plate while the rigid portion is releasably secured to said well casing and connected to the flexible portion; and a connector connected to the stereo phono cartridge;

a recording system connected to the microphone system for recording the movement of said cementing plug from said cementing head and through said well casing, the system including:

a tape recorder for recording the movement of said cement plug from said cementing head and through said well casing after the detection thereof by the microphone system; and a headphone listening system releasably connected to the recording system for listening to the movement of said cementing plug from said cementing head and through said well casing after the detection thereof by the microphone system.

10. The acoustic plug release indicator system of claim 9 wherein:

the stereo phono cartridge comprises a ceramic type stereo phono cartridge secured to the mounting plate.

11. The acoustic plug release indicator system of claim 9 wherein:

the stereo phono cartridge comprises a magnetic type stereo phono cartridge secured to the mounting plate.

12. The acoustic plug release indicator system of claim 9 wherein the flexible portion of the mounting plate is secured to the rigid portion of the mounting plate by adhesive tape.

13. The acoustic plug release indicator system of claim 9 wherein the rigid portion of the mounting plate of the microphone comprises a magnetic type rigid portion releasably secured to said well casing.

* * * * *